United States Patent
Lang

[11] 3,779,625
[45] Dec. 18, 1973

[54] HOLOGRAPHIC RECORDING WITH TWO GROUPS OF DIFFERENTLY ORIENTED PLANE POLARIZED OBJECT ILLUMINATION BEAMS

[75] Inventor: Manfred Lang, Munich, Germany

[73] Assignee: Siemens Aktiengesellschaft, Berlin and Munich, Germany

[22] Filed: Mar. 6, 1972

[21] Appl. No.: 232,018

[30] Foreign Application Priority Data
Apr. 1, 1971  Germany.................. P 21 16 013.4

[52] U.S. Cl. .............................................. 350/3.5
[51] Int. Cl. ............................................ G02b 27/00
[58] Field of Search ............... 350/3.5; 340/173 LJ, 340/173 LM

[56] References Cited
UNITED STATES PATENTS
| | | | |
|---|---|---|---|
| 3,614,191 | 10/1971 | Sakaguchi et al.................. | 350/3.5 |
| 3,604,778 | 9/1971 | Burckhardt......................... | 350/3.5 |
| 3,627,401 | 12/1971 | Kirk................................... | 350/3.5 |

*Primary Examiner*—Ronald J. Stern
*Attorney*—Carlton Hill et al.

[57] ABSTRACT

The present invention is directed to a method and apparatus for recording information on a holographic storage medium which information is presented in an information mask characterized by projecting a coherent light beam, which has been polarized in one direction, through a mask which changes the direction of polarization of discrete portions of the light beam which is subsequently divided into a plurality of light beams by a mosaic of lens. The plurality of light beams are projected through the information mask, which modulates the beam with information contained in the mask, and onto the holographic storage medium where a reference beam is superimposed therewith to record the information. The polarization mask is provided with statistically distributed raster of apertures so that a portion of the light beam passing through the material of the mask has its direction of polarization rotated relative to the direction of polarization of the other portion which passes through the apertures. The angle between the directions of polarization of the two portion of the light beam is in either a range of 80° to 100° and preferably 90° or a range of 170° to 190° and preferably 180°.

8 Claims, 2 Drawing Figures

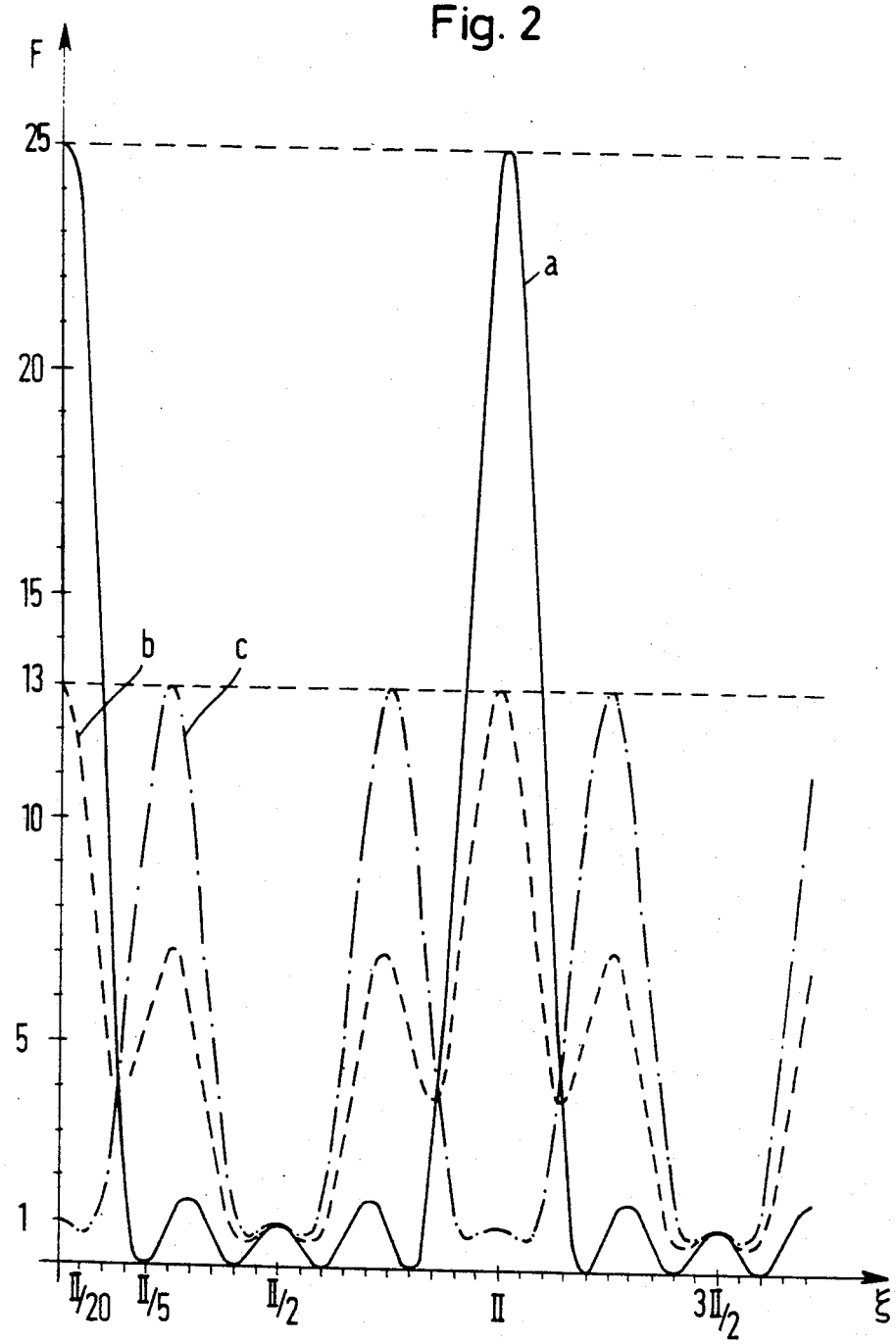

HOLOGRAPHIC RECORDING WITH TWO GROUPS OF DIFFERENTLY ORIENTED PLANE POLARIZED OBJECT ILLUMINATION BEAMS

BACKGROUND OF THE INVENTION

1. Field of the Invention

The present invention is directed to a method and apparatus for recording information in a holographic storage medium which information is arranged in a raster-like pattern on an information mask and is then subsequently recorded in the holographic storage plate by a use of a reference beam superimposed upon an object beam which has been modulated by the information of the mask.

2. Prior Art

If coherent light is modulated three-dimensionally, the information transported by the light waves can be stored holographically. The information which is to be stored is preferably imprinted in the form of a two-dimensional raster-like pattern of small holes in an information mask. In such a case, binary information (one bit) can be attributed to each spatial position in the raster-like pattern and is recorded in the hologram or system of interference strips with the presence of a hole in the mask corresponding to a binary 1 and the absence of a hole to the binary 0.

In order to produce a hologram, the information mask is illuminated by a coherent light beam, such as a light beam provided by a laser, and the beam is directed through a condenser or condensing lens to be a converging light beam. The light beam from the laser is modulated with the information from the mask and thus creates an object wave which is superimposed with the reference wave after passing through the information mask and the resulting interference field is registered according to its intensity on a light sensitive material to record a hologram containing the information. The entire information contained in the information mask and represented two-dimensionally is compiled optically in the smallest space; however, it is highly redundant in the focal plane of the condensing lens.

The modulated laser light beam thus creates an approximative Fourier transformation of the information contained in the information mask in the focal plane of the condensing lens. An interference of the light waves which are passing through the radially arranged holes in the information mask produces a light intensity distribution within the focal plane with a distinct peak structure which is a so-called interference structure. The amount of intensity maximums is in proportion to the square of the total number of holes in the information mask and in the present case, a typical coherent effect is present.

In the case of recording information as holograms which information is recorded as approximative Fourier transform holograms, an increase in the number of bits to be recorded produces an interference structure which has a reduction of the efficiency for utilizing the hologram area and consequently a reduction of the total defraction efficiency. In case of the presently known registering or recording materials, a limit of common Fourier transform holograms which can be recorded in a digital memory is approximately $10^3$ bits per information mask. However, for optical data storage, a larger storage capacity is required.

SUMMARY OF THE INVENTION

The present invention is directed to a method and apparatus which increases the capacity of information which can be recorded in a hologram storage medium which information was presented in a raster-like pattern on an information mask. The method is accomplished by dividing the illuminating beam into a plurality of coherent light beams with the number of beams in one group substantially equal to the number in the other group and rotating the direction of polarization of one group with respect to the direction of polarization of the other group. Preferably, the angle between the direction of polarization of one group with respect to the direction of polarization of the other group is an angle in the range of 80° to 100° or is an angle in the range of between 170° and 190° with the preferred angles being either 90° or 180°.

The apparatus for performing the method utilizes a means for producing a coherent light beam, a means such as a polarization mask having statically located portions for rotating discrete portions of the light beam which discrete portions of the light beams are then projected through a mosaic of light radiating sources which mosaic is preferably a mosaic of lens elements to converge the light onto the information mask. After passing through the information mask, the light rays are focused by a condensing lens onto a holographic storage material and a reference beam is superimposed thereon to form a holographic recording of the information contained in the information mask.

DESCRIPTION OF THE DRAWINGS

FIG. 2 is a comparison of the interference intensity structure or pattern of the prior art devices with the interference intensity structure or patterns produced by a method utilizing rotation of the polarization of a portion of the beam during recording.

DESCRIPTION OF THE PREFERRED EMBODIMENT

Figure 1:
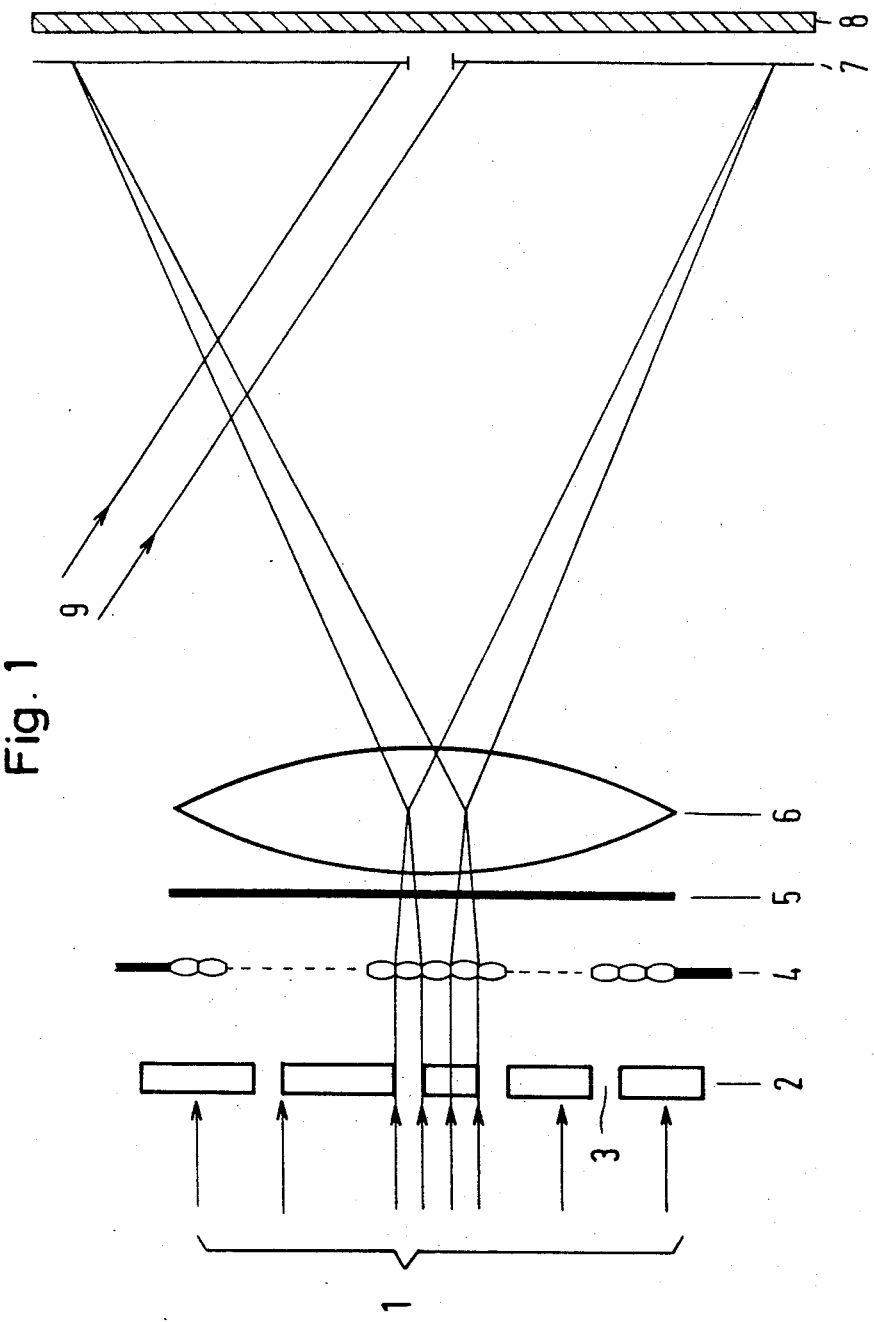
FIG. 1 is a diagrammatic illustration of an apparatus for performing the method of the present invention.

The principles of the present invention are particularly useful when incorporated in a method and an apparatus for recording information, which is stored on an information mask 5, as holograms onto a light sensitive material 8. To perform the method, a coherent light beam 1, which originates from a source of coherent light such as a laser is polarized to the same direction of polarization and is projected through a means for rotating discrete portions of the coherent beam 1, which means is illustrated as a polarizing mask 2. After passing through the mask 2, the light passes through an illuminating source 4 having illuminating members arranged in a raster-like pattern, which source 4 projects the light as a plurality of beams onto the information mask 5. After the light beams pass through the information mask 5, the beams are received by a condensing lens 6 and focused on the light sensitive material 8 through a movable shutter 7. To form a hologram recording, a reference beam 9 is superimposed through the opening in the shutter 7 with the beams from the information mask to record the information as a hologram on the material 8. The reference beam 9 is provided by a conventional hologram technique such as being split from the beam 1 after its emission from the laser source.

As illustrated, the raster of illuminated sources 4 is a mosaic of lenses arranged in a raster-like pattern which lenses divide the light beam 1 into a plurality of converging light beams that pass through the mask 5 for modulation. The information mask 5 may be in the form of the above mentioned prior art information masks which contain binary information in a raster-like pattern of holes. The polarizating mask 2 is preferably an optical active material whose discrete thickness for discrete portions of the illuminating beam 1 cause a rotation of the direction of polarization for the discrete portions of beam 1. As illustrated, the mask is provided with a plurality of apertures or openings 3 which are bored in the mask 2 in a statistically arranged raster pattern to form a group of the light beams passing through the mosaic of illumination sources 4 whose direction of polarization is not changed. The other group of beams projected on the information mask 5 have passed through the optically active material of the polarization mask 2 and have the direction of polarization rotated through a predetermined angle.

The coaction between the mask 2 and the raster of illuminating sources 4 subdivides the illuminating beam 1 into a plurality of smaller discrete beams with the number of discrete beams of one group whose direction of polarization has been rotated substantially equal to the number of beams in the other group whose direction of polarization was unchanged or was not rotated by the mask 2. The plurality of lenses in the raster pattern in the element 4 act as spherical wave radiators which produce a Fourier transform plane of the information mask with a distinct interference structure. If, however, the light source raster is utilized with the polarization mask of an optically active substance which is suitable to rotate the polarization direction of the light which has passed through it, the division of the light in the remote field of the lens raster does not show the distinct interference structure and becomes similar to a diffused object.

In the case of a given wave length and at an evenly maintained temperature, the rotation angle of the polarization direction is in proportion to the light permeated thickness of the optical active substance. Therefore, the polarization mask is constructed in such a way that it divides all of the light in the coherent light beam 1 statistically into two groups of approximately equal strength. The division takes place at the source 4 in such a way that the polarization direction for one of the groups of light beams as opposed to the polarization direction for the other group is turned or rotated a fixed angle in either a range of 80° to 100° but preferably 90° or a second range of 170° to 190° and preferably 180°. The angle of the rotation between the groups is determined by the additional thickness of the mask 2 that the one group of light beams passes through. The easiest way to produce such a mask is to bore the apertures or openings 3 in the mask so that one group is not affected by the optically active material whereas the other group goes through the full thickness of the mask 2.

If the amount of rotation between the two groups of beams forms an angle of approximately 90°, the reference beam 9 must be polarized with a direction of polarization which forms an angle of 45° with each of the directions of polarization of the two groups. However, if the amount of rotation of the polarization forms an angle between the two groups of approximately 180°, the reference beam 9 does not need subsequent polarization since it is branched off of the illuminating beam 1 in a conventional manner used in recording a hologram.

As mentioned hereinabove, the polarization mask 2 is formed of an optically active material such as cinnabar, sodium periodate, quartz, potassium hyposulfate or sodium chlorate. In addition to these materials, optically active liquids may be used for the mask 2 or any material showing a Faraday effect or a Kerr effect may be used.

Due to the coaction of the polarization mask 2 and the raster of spherical illuminating elements or lenses 4, the plurality of beams striking the information mask 5 are divided into two groups of equal number of beams. This results in the information holes provided in the mask 5 being subdivided into two groups, which are substantially equal in number, with one group modulating beams having one direction of polarization and the other group modulating beams having a direction of polarization forming an angle with the first group of approximately 90° or 180°.

FIG. 2 shows examples of the distribution light intensity in the remote field for five spherical wave radiators or lenses arranged in a linear row. Assuming that F constitutes the interference function and the $\xi$ is a normalized coordinate running parallel to the chain of the light sources, the solid curve line ($a$) refers to a specific case with all five radiation sources radiating light with the same direction of polarization. In this case, the maximum interference amounts to $5^2 = 25$. The curve ($b$) shows an interference structure in the case of a polarization direction of the radiation from the second and third sources has been rotated in respect to the polarization direction of the radiation from the first, fourth and fifth light sources by 90°. The dot-dash curve ($c$) shows an interference structure for the case when the polarization direction of the radiation from the second and third sources have been rotated with respect to the polarization direction of the radiation from the first, fourth and fifth sources by 180°. In both cases, the interference maximum does not amount to 25 but is only equal to $2^2 + 3^2$ which $= 13$. Thus with the increasing of the number of light sources statistical satistical distribution of the polarization directions, the character of the object wave striking the storage medium 8 resembles a diffused object wave.

Although minor modifications might be suggested by those versed in the art, it should be understood that I wish to embody within the scope of the patent granted hereon all such modifications as reasonably and properly come within the scope of my contribution to the art.

I claim:

1. In a method for recording information in a holographic storage medium wherein the information which is to be recorded is provided on an information mask in a raster-like pattern, the information being recorded by providing a beam of coherent light, dividing the beam of coherent light into a plurality of individual beams and projecting the plurality of individual beams through the information mask onto the storage medium, with the mask modulating the individual beams in accordance with the information stored in the raster-like pattern and superimposing a reference beam with the modulated beams on the medium to record the information as a hologram, the improvement comprising polarizing all of the coherent light in one direction and prior to projecting the individual beams through the information mask changing the direction of polarization of a portion of the individual beams so that the individual beams projected through the mask are in two substantially equal groups of beams with one group having a polarization direction forming a substantial angle with the polarization direction of the other group, said reference beam being plane polarized in a direction capable of interfering with both groups of said coherent beams.

2. In a method according to claim 1, wherein the angle included by the two polarization directions lies in a range of between 80° and 100°, and wherein the step of superimposing a reference beam includes providing a reference beam having a direction of polarization which is at an angle of approximately 45° to the direction of polarization of the two groups.

3. In a method according to claim 1, wherein the angle included by the two polarization directions lies in a range of between 170° and 190°.

4. An apparatus for recording information on a holographic storage medium wherein the information to be recorded is stored in a raster-like pattern on an information mask, the apparatus comprising means for providing a plane polarized coherent beam of light, means rotating the direction of polarization of discrete portions of said coherent beam, means for dividing the coherent beam into a plurality of coherent beams, said plurality of beams forming two substantially equal groups with one group of coherent beams having a direction of polarization at the angle to the direction of polarization of the other group, said dividing means projecting the plurality of coherent beams through the information mask onto the storage medium with the mask modulating the beams in accordance with the information stored thereon, and means for directing a reference beam plane polarized in a direction capable of interfering with both groups of said coherent beams to superimpose with the modulated beams on the storage medium to record the information in the form of holograms thereon.

5. An apparatus according to claim 4, wherein the means for rotating the direction of polarization is a polarizing mask having discrete portions of one thickness and discrete portions of another thickness.

6. An apparatus according to claim 5 wherein the polarizing mask consists of an optically active material.

7. An apparatus according to claim 4 wherein the means for rotating the direction of polarization comprises a mask of material having apertures therethrough arranged in statistically distributed raster positions.

8. An apparatus according to claim 7, wherein the polarizing mask consists of optically active material.

* * * * *